US010044695B1

(12) United States Patent
Cahill et al.

(10) Patent No.: US 10,044,695 B1
(45) Date of Patent: Aug. 7, 2018

(54) APPLICATION INSTANCES AUTHENTICATED BY SECURE MEASUREMENTS

(71) Applicant: Amazon Technologies, Inc., Reno, NV (US)

(72) Inventors: Conor Patrick Cahill, Waterford, VA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/475,382

(22) Filed: Sep. 2, 2014

(51) Int. Cl.
*H04L 29/06* (2006.01)
*G06F 21/44* (2013.01)

(52) U.S. Cl.
CPC .............. *H04L 63/08* (2013.01); *G06F 21/44* (2013.01); *H04L 63/06* (2013.01); *H04L 63/10* (2013.01)

(58) Field of Classification Search
CPC ......... H04L 63/08; H04L 63/10; H04L 63/06; H04L 63/20; G06F 21/44; G06F 21/51; G06F 8/65; G06F 21/62; G06F 21/53
USPC ..................... 726/26, 27, 2–7; 713/168, 175
See application file for complete search history.

(56) References Cited

U.S. PATENT DOCUMENTS

| | | | |
|---|---|---|---|
| 4,218,582 A | 8/1980 | Hellman et al. | |
| 4,405,829 A | 9/1983 | Rivest et al. | |
| 5,643,085 A | 7/1997 | Aityan et al. | |
| 5,643,086 A | 7/1997 | Alcorn et al. | |
| 5,666,533 A | 9/1997 | Horiguchi et al. | |
| 5,848,159 A | 12/1998 | Collins | |
| 5,867,578 A | 2/1999 | Brickell et al. | |
| 5,905,799 A | 5/1999 | Ganesan | |
| 6,071,190 A | 6/2000 | Weiss et al. | |
| 6,237,097 B1 | 5/2001 | Frankel et al. | |
| 6,364,796 B1 | 4/2002 | Nakamura et al. | |
| 6,631,354 B1 | 10/2003 | Leymann et al. | |
| 6,694,434 B1 * | 2/2004 | McGee ................ | G06F 21/565 713/182 |
| 6,722,986 B1 | 4/2004 | Lyons et al. | |

(Continued)

FOREIGN PATENT DOCUMENTS

WO    WO2008118648    10/2008

OTHER PUBLICATIONS

Stefan Berger et al, TVDc: Managing Security in the Trusted Virtual Datacenter, ACM, 2008.*

(Continued)

*Primary Examiner* — Shanto M Abedin
(74) *Attorney, Agent, or Firm* — Davis Wright Tremaine LLP

(57) ABSTRACT

A computer-implemented system and method for receiving a request to associate one or more application instance definitions with an application identity of an application configured with a set of permissions to access computer resources in an environment of a computing resource service provider. The system and method cause a computer system to store the one or more application instance definitions in association with the application identity of the application. The system and method also cause the computer system to evaluate a request originating from an application corresponding to the application identity and the application instance definition to determine if fulfillment of the request complies with the permissions.

19 Claims, 11 Drawing Sheets

(56) References Cited

U.S. PATENT DOCUMENTS

| | | | |
|---|---|---|---|
| 6,834,272 B1 | 12/2004 | Naor et al. | |
| 7,063,615 B2 | 6/2006 | Alcorn et al. | |
| 7,917,747 B2 | 3/2011 | Wolf | |
| 8,014,308 B2 | 9/2011 | Gates, III et al. | |
| 8,291,468 B1 | 10/2012 | Chickering | |
| 8,352,741 B2 | 1/2013 | Simon et al. | |
| 8,407,584 B1 | 3/2013 | Broodman et al. | |
| 8,473,754 B2 | 6/2013 | Jones et al. | |
| 8,478,977 B1 | 7/2013 | Smith et al. | |
| 8,566,216 B1 | 10/2013 | Topitzer et al. | |
| 8,694,795 B1* | 4/2014 | Aissi | G06F 21/30 713/187 |
| 9,116,733 B2 | 8/2015 | Banga et al. | |
| 9,154,479 B1 | 10/2015 | Sethi | |
| 9,177,353 B2 | 11/2015 | Chhabra et al. | |
| 9,246,690 B1 | 1/2016 | Roth et al. | |
| 9,323,686 B2 | 4/2016 | Mckeen et al. | |
| 9,389,933 B2 | 7/2016 | Baumann et al. | |
| 9,491,111 B1 | 11/2016 | Roth et al. | |
| 2002/0184046 A1 | 12/2002 | Kamada et al. | |
| 2003/0233544 A1 | 12/2003 | Erlingsson | |
| 2004/0176068 A1 | 9/2004 | Paatero | |
| 2005/0091535 A1* | 4/2005 | Kavalam | G06F 8/62 726/4 |
| 2005/0278418 A1 | 12/2005 | Rathakrishnan et al. | |
| 2006/0161887 A1 | 7/2006 | Krishnaswamy et al. | |
| 2007/0005992 A1* | 1/2007 | Schluessler | G06F 21/54 713/193 |
| 2007/0050763 A1 | 3/2007 | Kagan et al. | |
| 2007/0153715 A1 | 7/2007 | Covington et al. | |
| 2007/0174906 A1 | 7/2007 | Burchett et al. | |
| 2007/0206799 A1 | 9/2007 | Wingert et al. | |
| 2008/0080396 A1 | 4/2008 | Meijer et al. | |
| 2008/0216071 A1 | 9/2008 | Gidalov | |
| 2009/0112359 A1 | 4/2009 | Sanguinetti | |
| 2009/0204964 A1* | 8/2009 | Foley | G06F 21/53 718/1 |
| 2009/0313406 A1 | 12/2009 | Suh et al. | |
| 2010/0031325 A1 | 2/2010 | Maigne et al. | |
| 2010/0077473 A1 | 3/2010 | Ohta et al. | |
| 2010/0306379 A1 | 12/2010 | Ferris | |
| 2011/0179468 A1 | 7/2011 | Adams et al. | |
| 2012/0084838 A1 | 4/2012 | Inforzato et al. | |
| 2012/0144457 A1* | 6/2012 | Counterman | H04L 9/3271 726/5 |
| 2012/0159184 A1 | 6/2012 | Johnson et al. | |
| 2012/0192177 A1 | 7/2012 | Tsirkin | |
| 2013/0007239 A1 | 1/2013 | Agarwal et al. | |
| 2013/0024371 A1 | 1/2013 | Haririmani et al. | |
| 2013/0117561 A1 | 5/2013 | Chawla et al. | |
| 2013/0151846 A1 | 6/2013 | Baumann et al. | |
| 2013/0174150 A1 | 7/2013 | Nakajima | |
| 2013/0174151 A1 | 7/2013 | Nakajima | |
| 2013/0179682 A1 | 7/2013 | Ramachandran et al. | |
| 2013/0198853 A1 | 8/2013 | McKeen et al. | |
| 2013/0227286 A1 | 8/2013 | Brisson | |
| 2013/0246778 A1 | 9/2013 | Nikara et al. | |
| 2013/0282776 A1 | 10/2013 | Durrant et al. | |
| 2013/0312117 A1 | 11/2013 | Sapp, II et al. | |
| 2013/0318343 A1 | 11/2013 | Bjarnason et al. | |
| 2013/0318577 A1* | 11/2013 | Bulusu | G06F 21/00 726/5 |
| 2013/0326504 A1 | 12/2013 | Tsirkin et al. | |
| 2014/0051432 A1 | 2/2014 | Gupta et al. | |
| 2014/0075496 A1 | 3/2014 | Prakash et al. | |
| 2014/0105393 A1 | 4/2014 | Kolesnikov | |
| 2014/0108792 A1 | 4/2014 | Borzyski et al. | |
| 2014/0181359 A1 | 6/2014 | Zhang et al. | |
| 2014/0189246 A1* | 7/2014 | Xing | G06F 21/53 711/135 |
| 2014/0201841 A1 | 7/2014 | Deshpande et al. | |
| 2014/0205099 A1 | 7/2014 | Christodorescu et al. | |
| 2014/0223543 A1 | 8/2014 | Jeansonne et al. | |
| 2014/0282935 A1 | 9/2014 | Lal et al. | |
| 2014/0283098 A1 | 9/2014 | Phegade et al. | |
| 2014/0317686 A1 | 10/2014 | Vetillard | |
| 2014/0325515 A1 | 10/2014 | Salmela et al. | |
| 2014/0331317 A1* | 11/2014 | Singh | G06F 21/52 726/22 |
| 2014/0351583 A1 | 11/2014 | Bettale et al. | |
| 2014/0373012 A1 | 12/2014 | Ylitalo et al. | |
| 2015/0007175 A1 | 1/2015 | Potlapally et al. | |
| 2015/0058629 A1 | 2/2015 | Yarvis et al. | |
| 2015/0121536 A1 | 4/2015 | Xing et al. | |
| 2015/0127834 A1 | 5/2015 | Udupi et al. | |
| 2015/0143347 A1 | 5/2015 | Jones et al. | |
| 2015/0143374 A1 | 5/2015 | Banga et al. | |
| 2015/0143375 A1 | 5/2015 | Bruso et al. | |
| 2015/0199509 A1 | 7/2015 | Wille | |
| 2015/0200948 A1* | 7/2015 | Cairns | G06F 21/44 726/4 |
| 2015/0244716 A1 | 8/2015 | Potlapally et al. | |
| 2015/0254451 A1* | 9/2015 | Doane | G06F 21/44 726/1 |
| 2015/0278528 A1 | 10/2015 | Xing et al. | |
| 2015/0347768 A1* | 12/2015 | Martin | G06F 21/62 726/1 |
| 2015/0356462 A1 | 12/2015 | Fawaz et al. | |
| 2015/0379306 A1* | 12/2015 | Zimmer | G06F 21/72 713/193 |
| 2016/0036826 A1* | 2/2016 | Pogorelik | H04L 63/105 726/1 |
| 2016/0065376 A1 | 3/2016 | Smith et al. | |
| 2016/0088009 A1 | 3/2016 | Gupta et al. | |
| 2016/0203313 A1* | 7/2016 | El-Moussa | G06F 8/65 726/23 |

OTHER PUBLICATIONS

Goldreich et al., "How to Play Any Mental Game," In Proceedings of the Nineteenth Annual ACM Symposium on Theory of Computing (STOC '87), Alfred V. Aho (Ed.). ACM, New York, NY, USA, pp. 218-229, 1987.

Hoekstra, "Intel® SGX for Dummies (Intel® SGX Design Objectives)," retrieved Sep. 3, 2014, from https:|/software.intel.com/en-us/blogs/2013/09/26/protecting-application-secrets-with-intel-s, 4 pages.

Hoekstra, "Intel® SGX for Dummies—Part 2," retrieved Sep. 3, 2014, from https://software.intel.com/en-us/blogs/2014/06/02/intel-sgw-for-dummies-part-2, 3 pages.

Hoekstra, "Intel® SGX for Dummies—Part 3," retrieved Sep. 3, 2014, from https://software.intel.com/en-us/blogs/2014/09/01/intel-sgw-for- dummies-part-3, 3 pages.

Intel, "Software Guard Extensions Programming Reference," Intel® Reference No. 329298-001, Sep. 2013, 156 pages.

McKeen, et al., "Innovative Instructions and Software Model for Isolated Execution," Proceedings of the 2nd International Workshop on Hardware and Architectural Support for Security and Privacy, Jun. 23-24, 2013, Tel-Aviv, Israel, pp. 1-8.

* cited by examiner

APPLICATION INSTANCES AUTHENTICATED BY SECURE MEASUREMENTS

BACKGROUND

Modern computer systems place a high importance on maintaining data and application security. In a modern distributed and/or virtual computer system environment where users, services, applications, virtual machines, controlling domains and hosts have access to a computer system, credential management can be difficult and burdensome. Because of the inconvenience of credential management, application developers often end up storing application credentials within the application code or end up not using credentials at all, thereby creating an opportunity for unauthorized entities to gain access to application resources.

BRIEF DESCRIPTION OF THE DRAWINGS

Various embodiments in accordance with the present disclosure will be described with reference to the drawings, in which.

DETAILED DESCRIPTION

Figure 1:
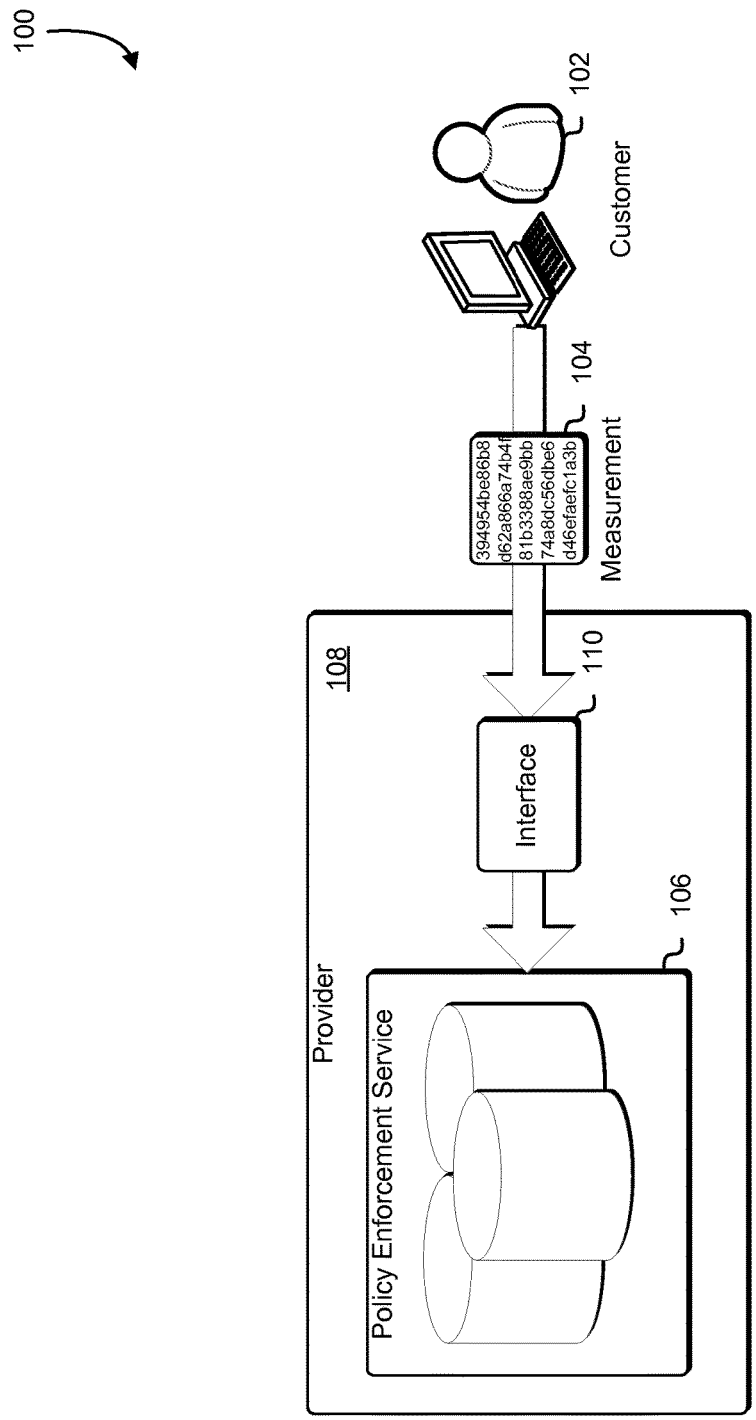
FIG. 1 illustrates an environment in which a software developer registers an application with a measurement in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include associating an identity and credential with a version of an application and utilizing the identity and the credential to validate installed instances of the application to enable the installed instances of the application to access resources. For example, an application developer may wish to provide an application that accesses resources of a computing resource service provider, such as a geographic map data store hosted by a data storage service of the computing resource service provider, while simultaneously preventing unauthorized users and applications from accessing the resources. The present disclosure describes techniques whereby the application developer may register an application with the computing resource service provider and cause the application to be measured. The application may be provided an identity with the computing resource service provider that can be authenticated, at least in part, using the measurement. For example, applications attempting to access the resources can provide the measurement to enable the service provider to use the measurement to determine that the applications are valid, unadulterated copies.

For instance, when an end user executes the application, the application may cause itself to be measured and, upon connecting with application resources hosted by a computing resource service provider, may supply its measurement as a credential confirming the validity of the application. In some cases, when a user installs the application, an application credential unique to that installation may be generated and registered to the particular copy, and whenever the installed (i.e., client) application attempts to access the resources, it may measure itself upon startup and provide its measurement as its unique application credential to the computing resource service provider. In this manner, management of credentials of particular copies and tracking of access of particular copies may be performed efficiently and securely.

In some embodiments, the application credential is a measurement of executable instructions of the application; and in some embodiments, the application credential is a credential specific to the particular copy of the application. Related to the latter example, in some examples, the application credential is associated with a voucher, and in others of these embodiments, the application credential is associated with a negotiation involving a product identification number. In still other embodiments, the association of the application identity and the application credential with the installed application may include an interactive user authentication session and/or an enclave measurement of the authentic version of the application. Containers of installed applications may further be configured to rotate credentials or cryptographic keys automatically without affecting users of the installed applications.

In some embodiments, the computing resource service provider or a customer of the computing resource service provider may host an online marketplace where application developers may make their applications available to users. In some of these embodiments, the application developer may upload an application—or a new version of an existing application—and the online marketplace may be configured to automatically measure the application and store the measurement. The online marketplace may further embed a unique application identity or application credential unique to particular copies of the application when providing the particular copies to users, and the unique application identity or unique application credential may be registered to the particular copy. In this way, a particular copy of the application may be tracked to the point of sale or download of the particular copy. In some of these embodiments, unique identities and application credentials may be automatically provisioned by an online marketplace for applications made available through the online marketplace.

FIG. 1 illustrates an aspect of an environment 100 in which an embodiment may be practiced. As illustrated in FIG. 1, the environment 100 may include an example of a developer 102 registering an application instance definition, in this case a measurement 104, of an application with a policy enforcement service 106 a computing resource service provider 108 through an interface 110. An application instance definition may be thought of as criteria defining an installed or running instance of an executable application. In some cases an application instance definition may be a measurement of at least a portion of the installed or running instance of the application; in other cases, application instance definitions may correspond to measurements of different versions of the application; and, in still other cases, the application instance definitions may correspond to individual installations of the application, such as through measurements of individualized application credentials, such as described in reference to the individualized credentials radio buttons 708 of FIG. 7, or through an application measurement and some other unique credential, such as a password. Note that, in some cases, the application instance definition may be registered (e.g., associated) with an application identity, such as an identifier that corresponds to the application. However, an application identifier need not be generated for the application at the registration phase of the application, but may be generated at a later time, such as when an end user executes the application and the application initiates communication with the computing resource service provider or service of the computing resource service provider; for example, once the client application provides its credentials and requests access to resources to the computing resource service provider, an application identifier indicating the identity of the application may be generated and associated with the application instance definition.

The developer 102 may provide software applications to end users. In some cases, the developer may be a customer of (i.e., the developer may have a customer account with or may be associated with an entity that is) a computing resource service provider. The developer 102 may register a measurement of an application that utilizes resources, such as data storage, hosted by the computing resource service provider for the developer 102. In some cases, the application may be made available for purchase through a delivery mechanism, such as an online marketplace hosted by the computing resource service provider 108. In other cases, the application may be made available to end users through other delivery mechanisms, such as a retail store or marketplace hosted by a different provider than the computing resource service provider 108. In the latter case, the computing resource service provider 108 may not interact with the application other than the application's connection to the computing resource service provider 108 resources.

The measurement 104 may be a measurement attesting to a startup state of the application. The measurement 104 may be made by launching the application in a secure execution environment, like an enclave supported through hardware (e.g., Intel SGX, TPM, etc.) or software (e.g., supported by a hypervisor of a virtual computer system service), and making an instruction call to the secure execution environment to measure the application and output the measurement 104. Note that the application may be launched in the enclave in its entirety or, in some instances, a selected portion of the application (i.e., a portion significant enough that, when measured, would attest that the application had not been tampered with to obtain unauthorized access to provider resources). The measurement 104 may be a hash of the application in execution memory, such that tampering with the application would result in a detectable difference in the hash value. Advantages of taking a measurement 104 in a secure execution environment include that the application and data within the secure execution environment may be inaccessible to untrusted outside entities, that there may be support built into the secure execution environment for taking measurements of applications and data inside the secure execution environment, and that the measurements may be certified by a digital signature provable as originating from the secure execution environment.

The policy enforcement service 106 may be a service of the computing resource service provider 108 that comprises a collection of computing resources collectively configured to determine whether to fulfill or deny requests to access resources hosted by the computing resource service provider 108. The computing resource service provider 108 may be any suitable computing resource service provider, such as the computing resource service provider 1002 described in conjunction with FIG. 10. The policy enforcement service 106 may determine whether fulfillment of a request complies with a policy governing a user.

Note that a user is an identity that may have an identifier that identifies the identity and authentication credentials ("credentials") associated with the identity for authenticating the identity of the user. The identity of the user may correspond to a customer of a computing resource service provider, an application, a resource, or a module. The credential may be used to authenticate the identity of the user, and thereby allow the identity to make programmatic calls to resources. The credential may also allow resource accesses to be tracked and audited against the identity. Some users may be associated with roles, which are policies that state a set of identities allowed to access resources and the types of access the identities are permitted to have to the resource.

Thus, when the interface 110 receives a request to register the measurement 104, the interface 110 may communicate with the policy enforcement service 106, whereupon the policy enforcement service 106 may make a determination whether a policy associated with the identity of the developer 102 allows the developer 102 to register the measurement 104 of the application. Note that the interface 110 may be any suitable interface between a computing system service and a user, such as a web service resource or application programming interface. If the policy enforcement service 106 determines that the developer 102 does not have sufficient permissions, the registration request may be denied. Otherwise, the policy enforcement service 106 may permit the measurement 104 to be registered in association with the application.

Figure 2:
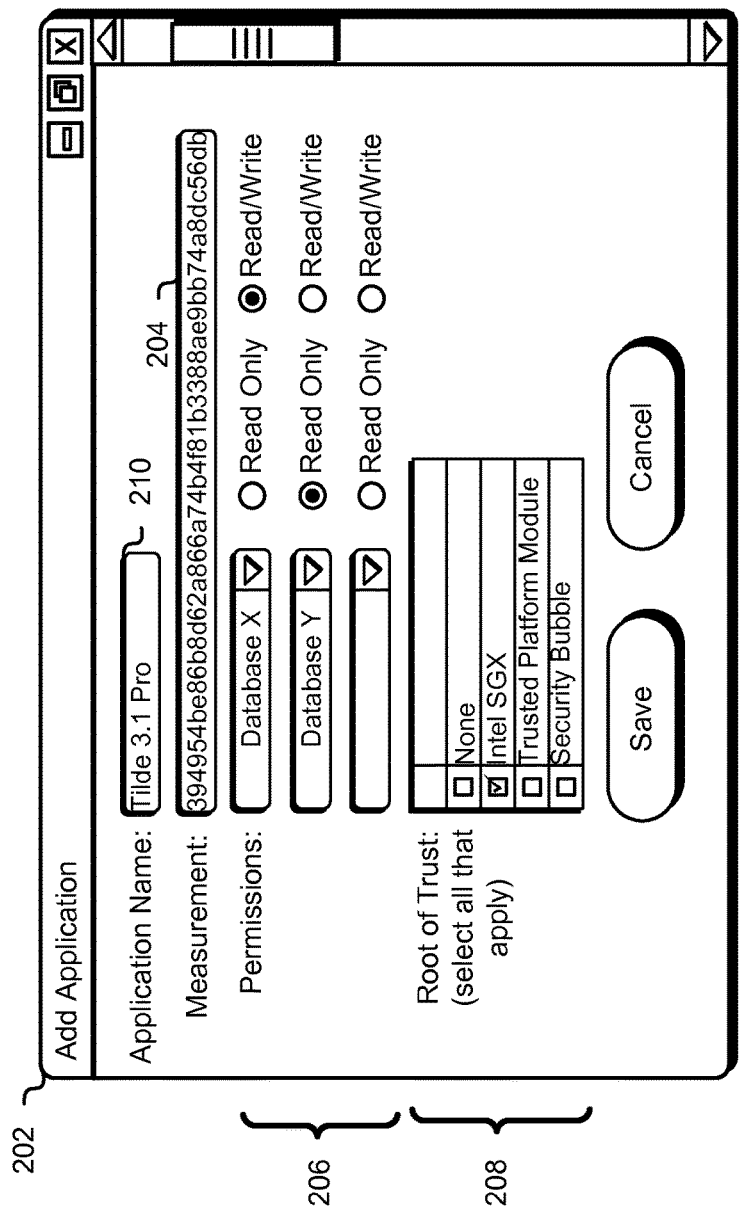
FIG. 2 illustrates an example interface through which a software developer may register an application in accordance with an embodiment.

FIG. 2 depicts illustrates a possible graphical user interface (GUI) 202 through which a developer, such as the developer 102 of FIG. 1, may register a measurement 204 of an application, which may be any executable software program, such as a mobile smartphone application or computer system desktop application, and potentially set policy 206 and one or more roots of trust 208 for the application to resources hosted by a computing resource service provider. The GUI 202 depicted is for illustrative purposes only and various types of interfaces known by persons having ordinary skill in the art are contemplating as being within the scope of this disclosure.

The GUI 202 may allow the developer to input information about the application to be registered, such as an identifier that corresponds to the identity of the application. The identifier may be an identification number or some other form of identification such that a computing resource service provider can identify which application is requesting access to resources. In some cases, the identifier may simply be a name 210 of the application. Note that in some cases, there may be multiple versions of an application, such as different revisions or different versions for different operating systems. Because measurements of different versions of the application likely will be different from each other, it may be that the developer may desire to associate a different identity with the different versions of the applications. Alternatively, the developer may use the same identity for the different versions of the applications and multiple measurements may be registered as valid measurements for the identity.

Installed versions of the application, when attempting to connect to the computing resource service provider for access to resources, may provide an identifier and a credential to the computing resource service provider for verification. The credential may be a measurement associated with the application. In the GUI 202, the developer may insert the measurement 204 of the application into a measurement field; however, it may also be that the GUI 202 may have functionality to launch the application into a secure execution environment, measure the application, and automatically insert the measurement 204 into the measurement field, such as in response to clicking a "Take Measurement" button element. In some embodiments, the measurement of the application may be made and validated by the software secure execution environment of a computing resource service provider of the resources, such as the bubble of safety described in U.S. patent application Ser. No. 14/476,520, filed Sep. 3, 2014, entitled "VIRTUAL SECURE EXECUTION ENVIRONMENT", which is incorporated by reference.

The measurement 204 may be a hash value or other value that represents an expected state of the application, such that even a slight modification of the application from its expected state yields a detectable difference in the measurement 204. The measurement may be remotely attestable as having originated from a secure execution environment, such as from an enclave supported by Intel® Software Guard eXtensions (SGX), a trusted platform module (TPM), or ARM TrustZone Technology. In this manner, an application that has been tampered with may be prevented from accessing resources because its measurement will be unable to match the expected credential of the valid version of the application.

The GUI 202 may also permit the developer to configure the policy 206 designating which resources (e.g., databases, etc.) of a computing resource service provider may be accessed by the application and the type of access (e.g., read, read/write, etc.). The configuration could be implemented with policies and roles within the computing resource service provider environment. Access to a resource by an application may include evaluating the policies associated with the application identity to determine whether the application has one or more permissions sufficient to access the resource and, if so, what types of permissions to the resource the application has. Examples of the types of resources that applications may have access to include access to a virtual computer system service 1008, a block-level data storage service 1010, a cryptography service 1012, an on-demand data storage service 1014, a notification service 1016, an authentication system 1018, a policy management service 1020, a task service 1022 and other services 1024 described with reference to FIG. 10. The GUI 202 may also allow the developer to configure the accepted roots of trust 208 for the application; that is, what types of secure containers a computing resource service provider whose attestations (e.g., digital signatures) may trust when receiving measurements from installed versions of the application.

Figure 3:
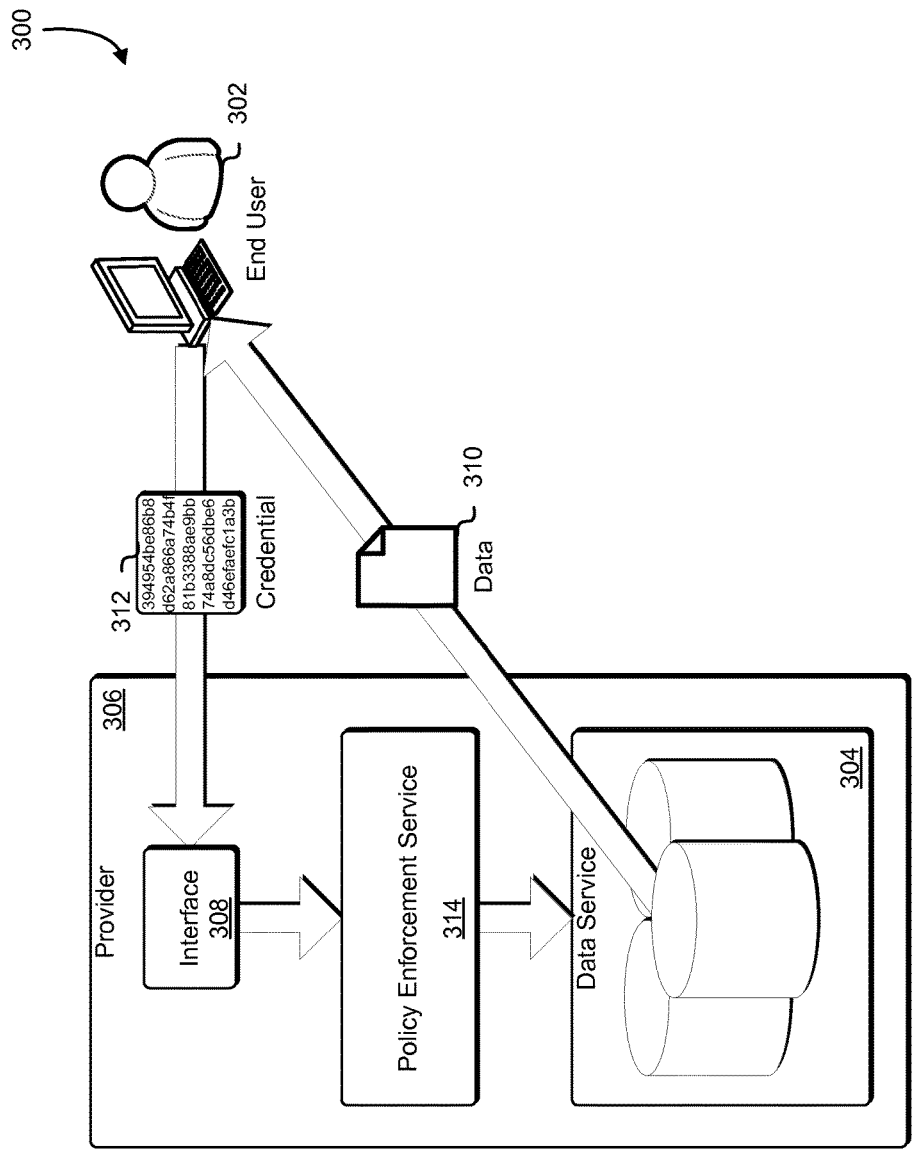
FIG. 3 illustrates an environment in which an end user supplies credentials to access resources of a computing resource service provider in accordance with an embodiment.

FIG. 3 illustrates an aspect of an environment 300 in which an embodiment may be practiced. The environment 300 of FIG. 3 depicts an end user 302 running a client application, such as an installed version of the application registered in FIG. 2, that requests to connect to a data service 304 of a computing resource service provider 306 through an interface 308 to obtain access to data 310, and the client application is verified as being an approved application by passing an application instance definition (e.g., credential 312) of the client application through the interface 308 to a policy enforcement service 314. The credential 312 or corresponding application may have associated policy/permissions that access to specified resources of a computing resource service provider, such as a data store of the data service 304. As noted, the application instance definition may be thought of as criteria defining an installed or running instance of an executable application. In some cases, an application instance definition may be a measurement of at least a portion of the installed or running instance of the application; in other cases, application instance definitions may correspond to measurements of different versions of the application; and, in still other cases, the application instance definitions may correspond to individual installations of the application, such as through measurements of individualized application credentials, such as described in reference to the individualized credentials radio buttons 708 of FIG. 7, or through an application measurement and some other unique credential, such as a password.

Figure 10:
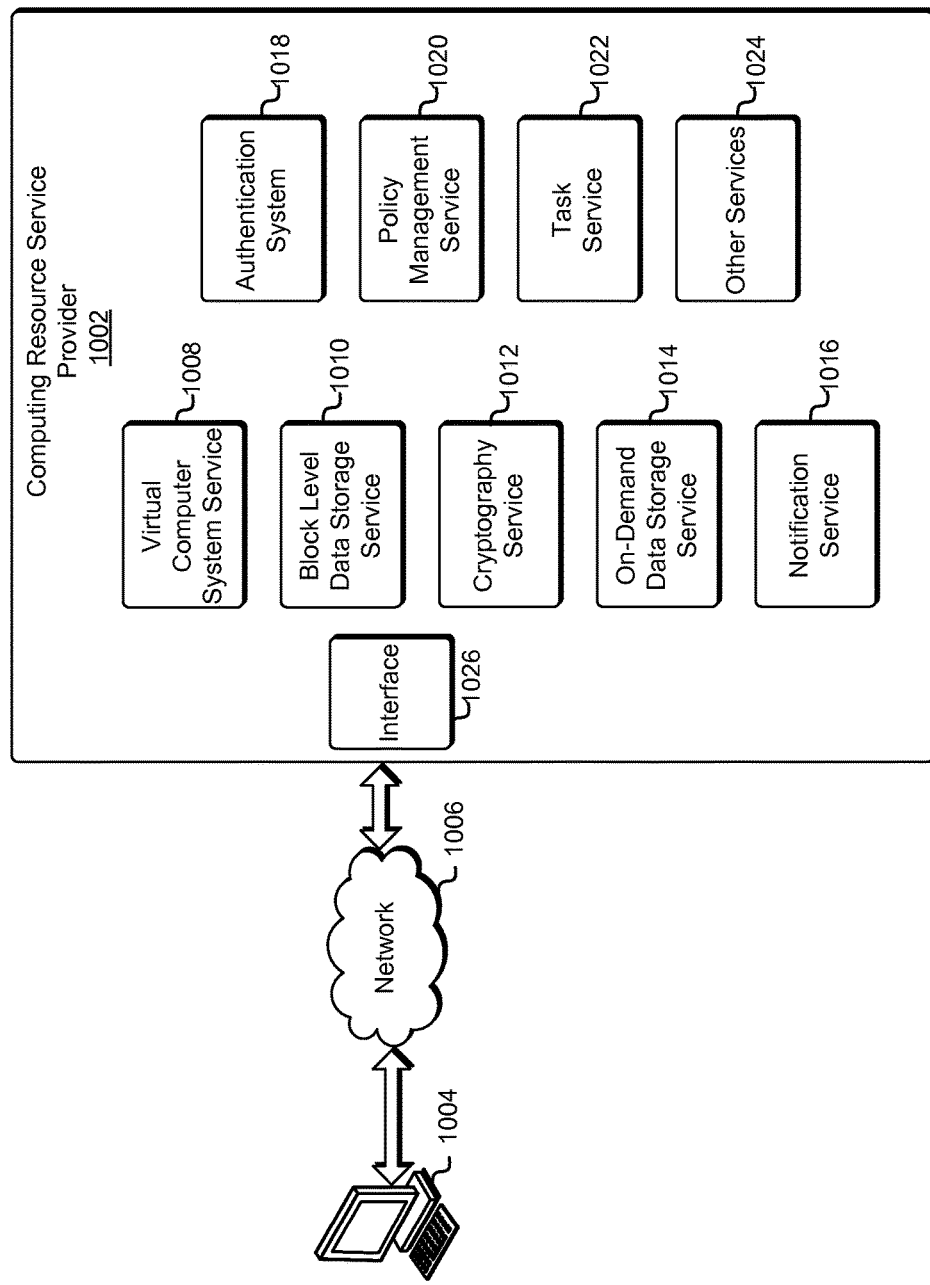
FIG. 10 illustrates an example of a customer connected to a computing resource service provider.

The computing resource service provider 306 may be similar to the computing resource service provider 1002 described in conjunction with FIG. 10; and, likewise, the data service 304 could be similar to the block level data storage service 1010, on-demand data storage service 1014, or some other data storage service 1024. A software developer, such as the developer 102 depicted in FIG. 1, may build the application, create the identifier for the application identity, and associate one or more measurements with the application identity as application credentials to allow the application running in the intended environment of the end user 302 to make programmatic calls to desired resources, such as web services resources or data storage resources. In some embodiments, the client code of the application itself may be configured to cause the execution client (i.e., the client computing device, such as a personal computer or smartphone) to measure the application. In other embodiments, an out-of-band measurement of the client application may be made, such as via a separate application, which may or may not be under the control of a computing resource service provider 306, may be utilized to measure the client application (also referred to as the "installed application" or the particular "copy of the application"). In either embodiment, the measurement may provide to the computing resource service provider the credential 312 for authentication of the client application. In some cases, there may be multiple versions of the application and the computing resource service provider 306 may separately manage the authentication and credentials for the different versions.

Note that the credential 312 may not just be a measurement of the executable code of the application, but may be a measurement of the runtime image of the application. Thus, the application may first be loaded into execution space of a container, which may be in an enclave, and once loaded, the application execution space may be measured and the credential registered with a computing resource service provider as a verified measurement of the application. A container in this context refers to the environment in which the application is executing. In some cases, this may be a secure execution environment, such as an enclave, the container may be a virtual machine instance or an operating system.

In some embodiments, the credential for each installed version of the application may be unique (i.e., individualized) to the installed version or the particular copy of the application. For example, in some cases, the measurement may further be linked to the installed application by a voucher exchange during a bootstrapping process. An example of such a voucher exchange may be that, when an application is installed, bootstrap code, when executed, may cause the computing resource service provider to be notified of the installation, and the computing resource service provider may respond by providing the customer with a code (e.g., through an e-mail message or a link to a website). The customer may then enter the code into the application or provider website or through an application interface, which thereafter associates the code and the measurement of the application as the credential 312 used to validate the application identity for the installation. Alternatively, in a similar installation process, the credential may include a negotiation involving a product identification number. For example, the client application may come packaged with a product key (i.e., install code) or serial number that the customer may enter during or after installation of the application to validate the application identity for the installation. Similarly, the application may have been downloaded with a unique product key (i.e., install code) or other number that distinguishes the particular copy from every other copy of the application. The measurement of the application, in these cases, provides assurance that the installed application has been authenticated, and the voucher or product key provides a way to uniquely identify the particular copy of the installed application.

In some of these embodiments, the measurement and the individualized credential may be provided separately to the provider to uniquely distinguish the installed application from other installed applications, and in other embodiments, the individualized credential may be the container memory when the installed application is measured, thereby generating a unique measurement for the installed application, and the unique measurement may be registered with the provider upon a first execution as corresponding to the installed application. By providing the computing resource service provider with credentials unique to each installed copy of the application, the installed copy may be tracked separately and cryptographic keys usable between an individual application instance (e.g., the installed application) and the computing resource service provider may be rotated and renegotiated at will independently of other application instances (e.g., other client installations of the application).

Note that in some embodiments, the credential 312 (e.g., a hash of the executable code of the application) may be registered in association with an application identity as described in FIG. 1, but program code of the application may be configured to be executed by the computing resource service provider or service of the computing resource service provider. In this embodiment, the computing resource service provider or the service of the computing resource service provider may launch the code, measure the code, verify that the measurement matches the expected registered credential 312, and, upon successful verification, if the application identity has sufficient permissions (e.g., by the policy enforcement service 314 checking policy/permissions associated with the application identity), the computing resource service provider may continue to execute the code and authorize the code to access necessary resources. If verification of the measurement is unsuccessful, the computing resource service provider may presume that the provided code is not an authorized version and disallow the code access to requested resources and, in some cases, terminate execution of the code.

The interface 308 could be any type of interface suitable for passing the credential 312 to the policy enforcement service 314 of a computing resource service provider 306, such as web service or application programming interface. The policy enforcement service 314 may be the same or different than the policy enforcement service 106 described in conjunction with FIG. 1. But in the environment 300, the policy enforcement service 314 serves to determine whether the credential 312, or at least the measurement portion of the credential 312, of the application installed by the end user 302 matches a measurement (e.g., the measurement 104 provided by the developer 102) associated with an approved version of the application.

If the policy enforcement service 314 determines that the credential 312 matches a valid copy of the application, the policy enforcement service may then determine whether policies associated with the identity and the requested resource allow the installed application to access the requested data 310 from the data service 304. Note that, in some embodiments, a software developer may not register an application by directly providing the application or its measurement in a separate registration phase, such as described in FIGS. 1 and 2. Instead, an end user, or the software developer, running the application, may launch the program that, upon an initial communication with a service of a computing resource service provider hosting resources used by the application, registers itself with the computing resource service provider by providing its credential 312 to the computing resource service provider. In some cases, the application may be running on a client computer system, and in some cases the application may be running in a virtual machine instance or other computer system of a distributed computing system service of the computing resource service provider. The computing resource service provider may then generate an application identity or identifier, store this initial credential 312 in association with the application identity or identifier, and authorize the application to access the resources. Thereafter, future attempts by the application to access resources of the computing resource service provider may involve presenting a credential 312 or that the computing resource service provider matches against the initial credential 312 or measurement to determine whether the application is the same application that was originally authorized to access the resources.

In this context, a policy may be information that is determinative of whether a requested operation can be performed. The policy may be encoded in a declarative access control policy language, such as eXtensible Access Control Markup Language (XACML), Enterprise Privacy Authorization Language (EPAL), Amazon Web Services Access Policy Language, Microsoft SecPol or any suitable way of encoding one or more conditions that must be satisfied for the operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given.

Once the policy enforcement service 314 determines that the application has permission to access the requested data 310, the policy enforcement service may provide the data 310 to the application. Note that in some cases, access may be enabled by a negotiation that shares one or more cryptographic keys to the installed application and the computing resource service provider 306, such that messages and data may be securely exchanged between the computing resource service provider 306 and the installed application. Examples include secure sockets layer, transport layer security, internet protocol security, secure socket tunneling protocol and other similar methods of secure communication as would be understood by a person having ordinary skill in the art. Note that although not depicted in this environment 300, once the application is validated, the data 310 may be passed through the interface 308 or a different interface to/from the installed application.

Figure 4:
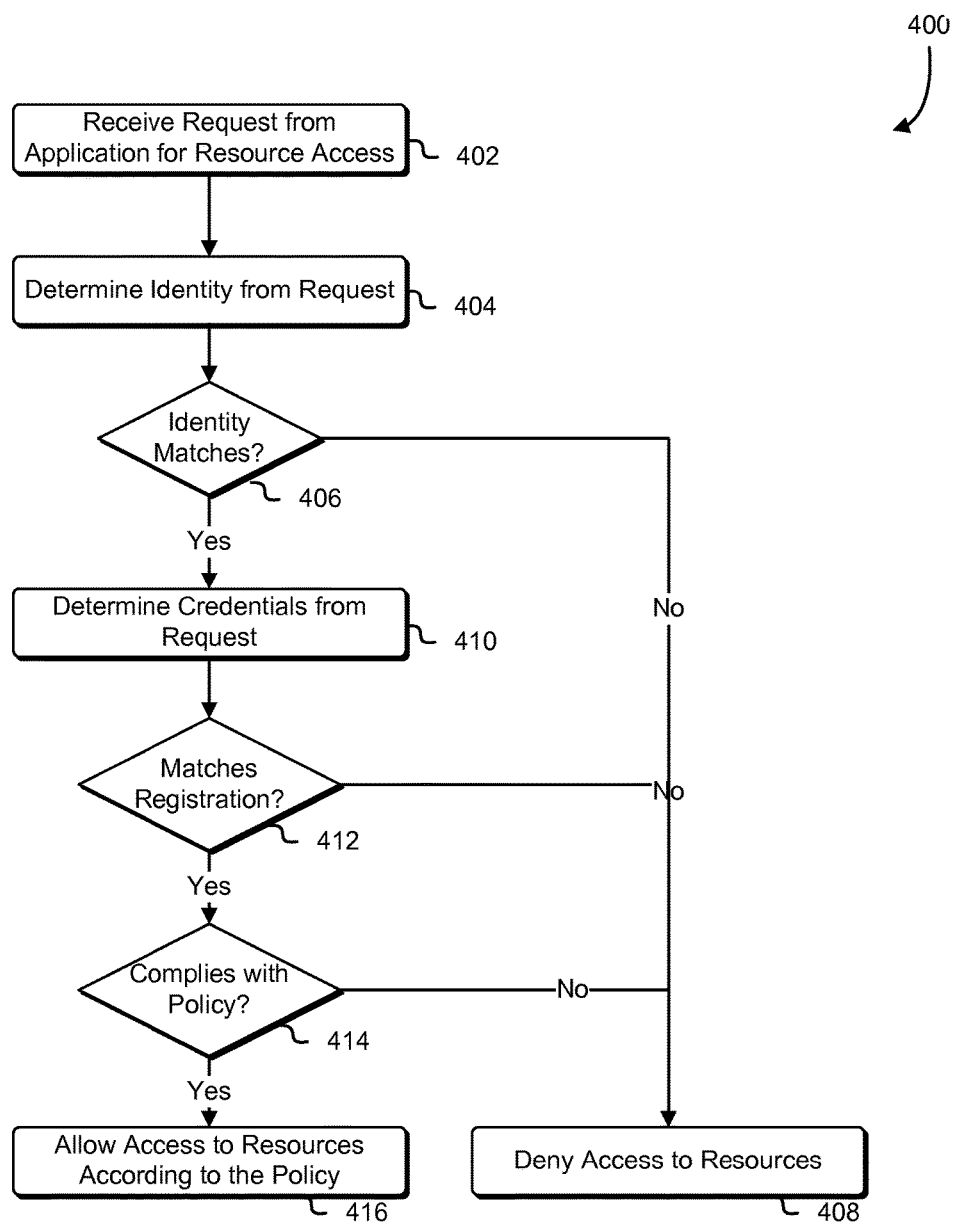
FIG. 4 is a flow chart that illustrates an example of a registered application attempting to access resources in accordance with an embodiment.

FIG. 4 is a flow chart illustrating an example of a process 400 that an application in accordance with various embodiments may follow to access a resource of a computing resource service provider. The process 400 may be performed by any suitable system such as a server in a distributed system of a data center, or any electronic client device such as the electronic client device 1102 described in conjunction with FIG. 11. The process 400 includes a series of operations wherein an installed application communicates an identifier and a credential to a computing resource service provider. In 402, the computing resource service provider receives a request, such as through a call to a web service or application programming interface, from an installed application to access a resource hosted by the computing resource service provider. The request may include an identifier specifying an identity and one or more credentials of the application. Note, that in some cases the application identifier and/or credentials may instead be provided in response to a query from the computing resource service provider. An example of such an application may be a geographic mapping application installed on a smartphone seeking to access map data stored with a data storage service of the computing resource service provider by the developer of the application.

In 404, the computing resource service provider may determine the identifier associated with the identity of the installed application. As some examples, the identifier may be passed to the computing resource service provider as a parameter of an application programming interface call or may be parsed from a web services request, or, in cases where the identifier is not passed with the request received in 402, the identifier may be provided in response to a query made by the computing resource service provider. The identifier may be any form or manner of identifying the application as would be known by a person having ordinary skill in the art; for example, the identifier may be numerical, such as an auto-generated number assigned to the application when the application was registered with the computing resource service provider by the developer, or the identifier may the name of the application. In some cases, different versions of the application (e.g., distinguishing a previous year's version of the application from the current version, distinguishing versions written for different operating systems or devices, etc.) may have different identities, while in other cases an identity may be shared between some or all versions of the application. In 406, the computing resource service provider determines whether the received identifier matches known identities of applications. Note that the term "match," in the context of the present disclosure, does not necessarily mean that the values must be equal.

If the computing resource service provider cannot determine that the application is one that it knows, the system performing the process 400 proceeds to 408, whereupon the computing resource service provider may respond to the application that access to the resources is denied. In some cases, the unsuccessful attempt to access the resources may also be logged by the computing resource service provider. Otherwise, the system performing the process 400 may proceed to 410, whereupon credentials of the application may be determined. Similar to 404, the credentials may be passed to the computing resource service provider as a parameter of an application programming interface call or may be parsed from a web services request, or, in cases where the credentials are not passed with the identifier in 402 or 404, the credentials may be provided in response to a query made by the computing resource service provider.

The credential may comprise a measurement of an execution state of the installed application, such as a measurement made of the application in a secure execution environment such like an enclave. The measurement of the execution state may be a measurement of the application's executable instructions in memory before the first instruction is executed. In some cases, the measurement of the execution state may be a measurement of the application in memory after the first instruction has been executed but while the application is in a stable state, such as waiting for input from a user. The measurement may be of only certain identified portions of the application code that the developer wishes to protect. In some instances, the measurement may be in the form of a hash value of the executable instructions and/or data in memory at the time of the measurement, but other measurements of applications as would be contemplated by a person having ordinary skill in the art should also be considered as within the scope of the present disclosure. The credential may also be received with a data (e.g., an attestation) that may authenticate the root of trust of the measurement mechanism; for example, the credential may be accompanied by a digital signature verifiable as having originated from an enclave, such as may be done through a public key infrastructure with the public key attested by a certificate authority. The credential may further include data that identifies the particular copy of the application, such as a product key or user password.

The information comprising the credential may be verified in 412. That is, the measurement of the credential may be compared against known measurements associated with the application identity, and if no match is found, the system performing the process 400 may proceed to 408 whereupon access is denied. Additionally, an attestation (e.g., a digital signature) chained to a root of trust may be verified in 412 and, if the attestation cannot be verified, the system performing the process 4, as mentioned, may proceed to 408 whereupon access is denied. Likewise, data identifying the particular copy or a particular user of the application may be verified and, if the data cannot be verified, access may be denied in 408. As an example, an installed application may be verified as being a valid copy by matching the measurement of the application to an expected measurement, but to ensure that the application is being used by an approved user, a password may be provided in addition to the measurement. Note that the term "match," in the context of the present disclosure, does not necessarily mean that the values must be equal. For instance, two values may be said to match if it can be determined that one value corresponds to the other value (i.e., in some cases this may mean one value equals the other value, while in other cases the values may not be equal but are still considered to match). Here, for example, a match may be found if the credential is determined to correspond to the measurement. Thus, in some cases, a match may be determined if the credential equals the measurement, however other ways of matching may also be used.

If the credentials provided in 410 are verified in 412, the system performing the process 400 may proceed to 414, whereupon the system determines whether the policy associated with the application identity and credentials permit the requested access to the resources. As noted in the description of 314 of FIG. 3, a policy may be information that is determinative of whether a requested operation can be performed. The policy may be encoded in a declarative access control policy language, such as eXtensible Access Control Markup Language (XACML), Enterprise Privacy Authorization Language (EPAL), Amazon Web Services Access Policy Language, Microsoft SecPol or any suitable way of encoding one or more conditions that must be satisfied for the operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given.

If it is determined in 414 that the applicable policies do not permit access to the requested resources, the system performing the process 400 proceeds to 408; otherwise, the system performing the process 400 proceeds to 416 and the application is allowed to have the requested access to the resources. From this point, communication between the application and the resource may be secured through various methods, such as by establishing a cryptographic session key to be used for messages and data exchanged between the installed application and the computing resource service provider. Note that the operations performed in 402-06, 410-14 may be performed in various orders and combinations, including in parallel.

Figure 5:
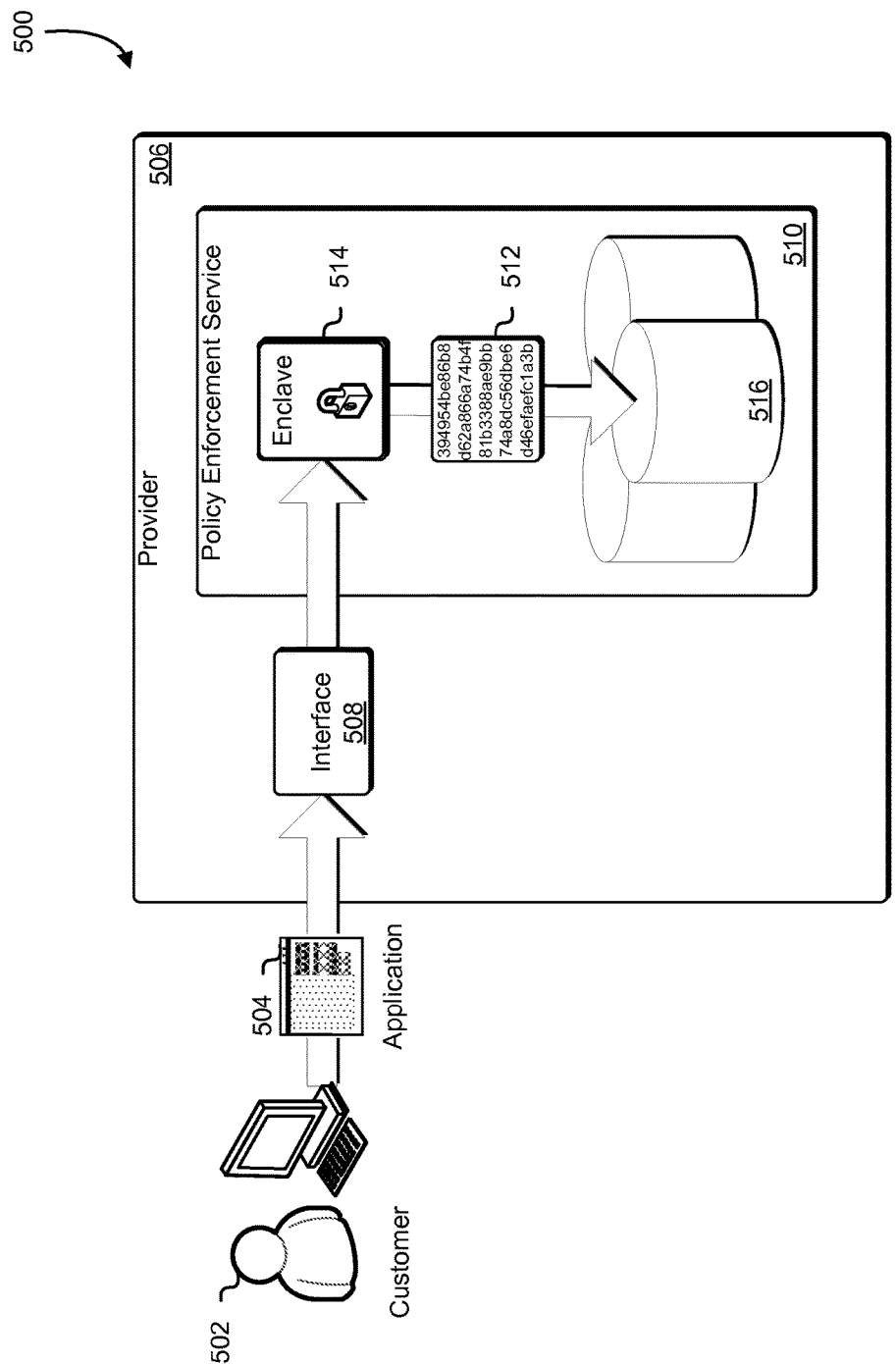
FIG. 5 illustrates an online marketplace environment in which a software developer uploads an application in accordance with an embodiment.

FIG. 5 illustrates an aspect of an environment 500 in which an embodiment may be practiced. Specifically, FIG. 5 depicts an embodiment where a developer 502 may upload application code 504 to a computing resource service provider 506 through an interface 508, whereupon a policy enforcement service 510 may obtain a measurement 512 of the application, such as by measuring the application within an enclave 514, and storing the measurement in a data store 516. As noted, the developer 502 may be a customer of (i.e., may have an customer account with) a computing resource service provider seeking to upload an application to an online marketplace hosted by the computing resource service provider, the developer may be a seller seeking to upload an application to an online marketplace being run by a customer of the computing resource service provider, or the developer 502 may be only seeking to register the application 504 with the computing resource service provider 506 and the developer 502 may make the application 504 available to end users through some other manner.

The application 504 may be any type executable program code, such as a messaging application, mapping application, or financial data application, for use with an electronic client device, including a personal computer, laptop, smartphone, satellite television receiver, streaming media device, and a tablet computer. The electronic client device may have a the ability to measure the installed application in order to attest to the computing resource service provider 506 that it is a valid version of the application 504, such as with an enclave protected by hardware or software on the client device, or an out-of-band way component may measure the installed application, such as by way of a remote measurement initiated by the computing resource service provider 506.

The interface 508 may be an application programming interface provided by the computing resource service provider 506 to its customers for registering developed applications. The interface 508 may process a request to register the application 504 by launching the application within the enclave 514, and instructing the enclave to measure the state of the launched application in the enclave 514 memory. Note that the application may be launched in the enclave in its entirety or, in some instances, a selected portion of the application (i.e., a portion significant enough that, when measured, would attest that the application had not been tampered with to obtain unauthorized access to provider resources). The policy enforcement service 510 may then take the resulting measurement 512 and store it in association with the application 504; that is, in some cases the measurement 512 itself may be enough to identify the application 504, whereas in other cases it may be desirable to assign a separate identity to the application 504 and associate the measurement 512 with the identity.

For example, there may be multiple versions of an application, such as different versions written for different operating systems and devices, and the policies associated with the application 504 defining the set of permissions the application 504 may have to certain resources hosted by the computing resource service provider 506 may be the same for these versions. In such a case, it may be preferable, at least from a policy management standpoint, to have the policies associated with one identity of the application 504 rather than measurements of each version of the application. The application identity and measurement may be stored in a data store 516 usable by the computing resource service provider 506 and the policy enforcement service 510 for determining whether installed versions of the application 504 are authentic. Although the enclave 514 and the data store 516 are illustrated as being within the policy enforcement service 510, either or both components may be located under the control of other services of the computing resource service provider and accessible by the policy enforcement service 510.

Note that the measurement 512 may not just be a measurement of the executable code of the application 504, but rather may be a measurement of the runtime image of the application 504. Thus, the application 504 may first be loaded into the execution space of a container, which may be in an enclave such as enclave 514, and once loaded, the application 504 execution space may be measured and the measurement registered with a computing resource service provider as a verified measurement of the application 504. In some cases, this may be a secure execution environment, such as the enclave 514. In other cases, the container may be a virtual machine instance or an operating system.

The enclave 514 is a protected area in the memory address space of a computer system that provides confidentiality and integrity for applications and data within the protected area. The enclave 514 operates as a secure execution environment; that is, the enclave 514 prevents applications external to the enclave 514, even privileged applications such as virtualization monitors, basic input/output systems, operating systems, and even other enclaves, from accessing the enclave 514 memory address space. However, applications executing within the enclave 514 may access executable instructions and data internal to the enclave 514. The enclave 514 prevents access to unencrypted enclave data (i.e., data resident within the enclave 514) by applications external to the enclave 514, and when the data is written to the memory address space, the data is encrypted automatically. Additionally, information exiting the enclave 514 may be cleansed of data referring to protected memory addresses of the enclave 514 to prevent external software from determining the location of enclave-protected data in memory.

A characteristic of the enclave 514 is an ability to provide remote attestation as to the state of the enclave 514. For example, the enclave 514 may have a set of functions that, when executed by a processor, provide a measurement indicating the current state of executable code and/or data within the enclave 514. Another characteristic of the enclave 514 is that it has a root of trust separate and protected from outside entities. That is, the enclave 514 may have cryptographic keys resident within the enclave 514 for digitally signing data output from the enclave 514, and, by verifying the digital signature, applications external to the enclave 514 may be configured to trust the output data.

Utilizing a hardware or software-protected execution environment (e.g., an enclave) to provide an application measurement allows the computing resource service provider 506 or the application developer 502 to take advantage of an enclave's native support for providing a measurement of applications and data launched within the enclave. For example, the Intel® Software Guard eXtensions support instructions that compute a cryptographic hash measurement of code and data launched in the enclave environment. The enclave further provides native protection against tampering with the measurement 512 or the application 514 by outside entities, as once the code of the application 504 is loaded into an enclave, it is protected against all external software access. At any time, if the software developer wishes to confirm that the expected measurement for the application 504 has not changed or been tampered with, the application 504 can be again launched within the enclave and a measurement taken so that the software developer can compare the measurement with the expected measurement. In such embodiments, the installed application may provide its credential by launching itself within an enclave on the client computer system, and the enclave is instructed to provide a measurement of the installed application to be used as the application credential. In some cases, the client application may be launched by way of a bootloader (i.e., bootstrapping code) that launches the application into a container, such as an enclave, and causes the container to measure at least a portion of the application and provide that measurement to the computing resource service provider.

In some embodiments, an enclave may be configured using dedicated hardware, which may implement a variety of security assurance methods including microcode instructions on a central processing unit, and a trusted platform module. When an enclave is created, the creator of the enclave may receive an access key through which access to the enclave is controlled, and any entity without proper credentials may be prevented from accessing confidential data and/or applications configured to access the confidential data by storing the data and/or applications in the enclave.

Enclave functionality may be provided to a system through software, such as under the control of a hypervisor or a kernel of an operating system that allows virtualized user space instances, or through hardware by a specialized instruction set, such as Intel® Software Guard eXtensions, a module such as a trusted platform module, system microcode or combinations of these. Enclave functionality allows programmatic instantiation of the enclave 514, which may comprise initializing of an enclave control structure, allocating enclave memory, loading of enclave contents (e.g., applications and/or data loaded into the enclave 514) into the enclave 514 memory, measuring of the enclave 514 contents, and establishing an enclave 514 identity. Enclave functionality may also include the ability to protect applications and/or data within the enclave 514 from malicious software attacks, by detecting integrity violations of protected applications and/or data and preventing access to protected applications and/or data that fail integrity checks.

Figure 6:
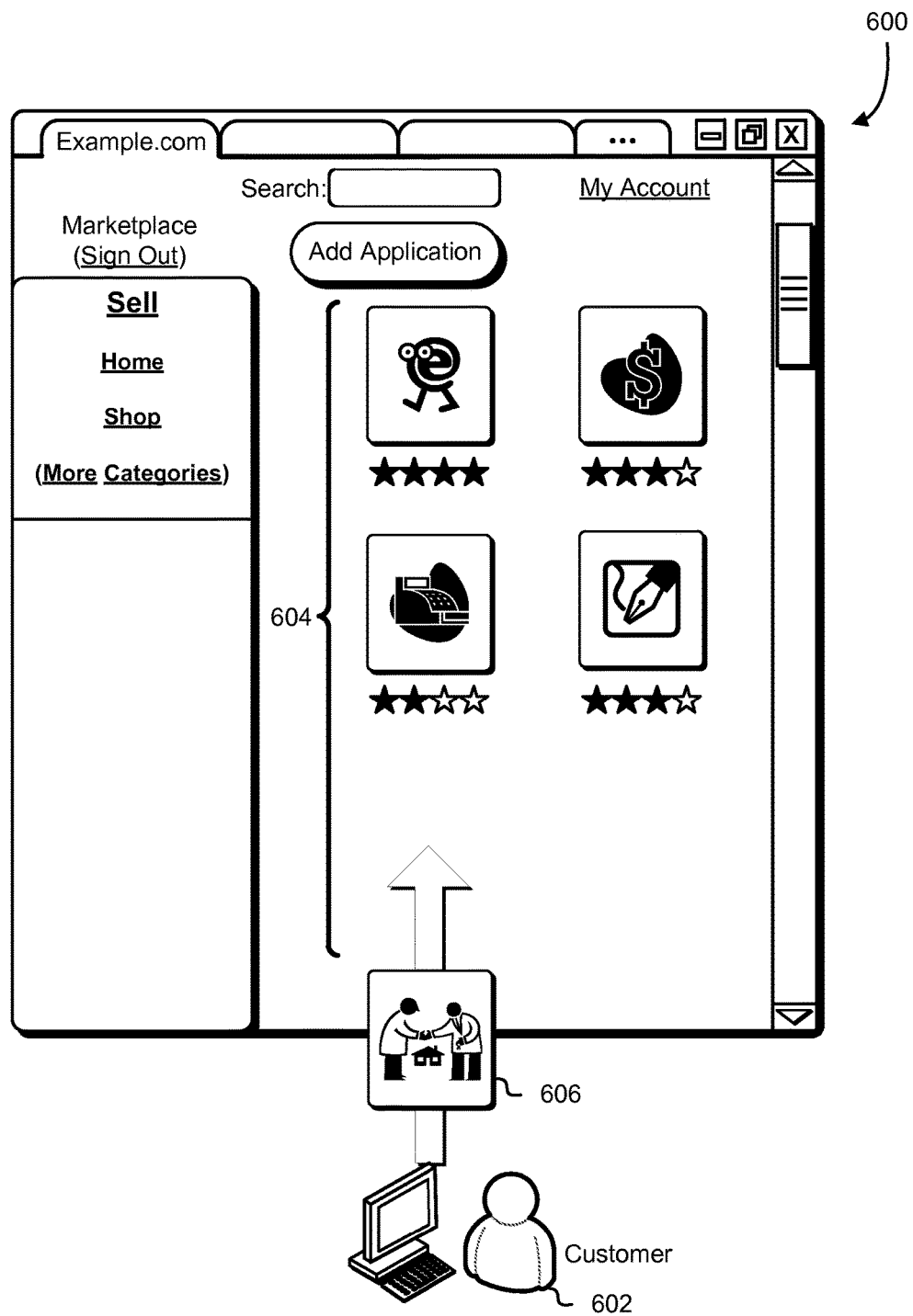
FIG. 6 illustrates an example of an online marketplace for applications in accordance with an embodiment.

FIG. 6 illustrates an example online marketplace 600 through which a developer 602 may provide applications to users in accordance with an embodiment of the present disclosure. In this embodiment, when the application developer 6 uploads an application 606 into the online marketplace 600, the online marketplace 600 may be caused to automatically measure the application 606 and register the measurement with the online marketplace provider as being associated with the application 606. Additionally, an alternate or updated version of the application 606 may also be uploaded, measured, and associated with the alternate or updated version of the application 606. In some of these embodiments, the measurement may serve as the application credential when connecting to resources of a computing resource service provider; that is, the application 606 may pass the computing resource service provider an application identity and a known application state may be measured and the measurement passed to the computing resource service provider as the application credential.

As illustrated in FIG. 6, the online marketplace 600 may allow the developer 602 to upload applications 604 and 606 for download by the public. In some cases, the online marketplace 600 may be provided by a computing resource service provider, such as the computing resource service provider 506 or a customer of the computing resource service provider 506, in a manner similar to that described in FIGS. 5 and 8. However, in some embodiments, the application code may be measured by the computing resource service provider, but the application 606 may be made available for use by end users through an online marketplace hosted by a different provider than the registering provider or may be sold on computer-readable media through a local retailer.

The online marketplace 600 may provide end users with the ability to select and obtain license to particular copies of the applications 604. In some models, the licensed copies may be purchased, and in other models, the copies may be provided without cost to the end user. In some models, the online marketplace 600 may provide links to other websites or vendors providing the particular copies rather than providing the particular copy in the online marketplace itself. In still other embodiments, the online marketplace may allow end users to obtain physical/tangible computer-readable medium (such as a software compact disc) with the selected copy of the application provided on the physical/tangible computer-readable medium.

In some cases, the marketplace provider may embed bootstrap code for launching the application code and taking a measurement of the application 606 with the application file when it is uploaded. For example, a developer may upload the application 606 to an online marketplace, and the marketplace provider may embed the application 606 with bootstrap code such that when an end user downloads and runs the application 606, the bootstrap code may launch the application 606 into an enclave and cause the enclave to produce a measurement of the application 606. The measurement then may be provided to an application programming interface of a computing resource service provider hosting the resources used by the application 606.

Figure 7:
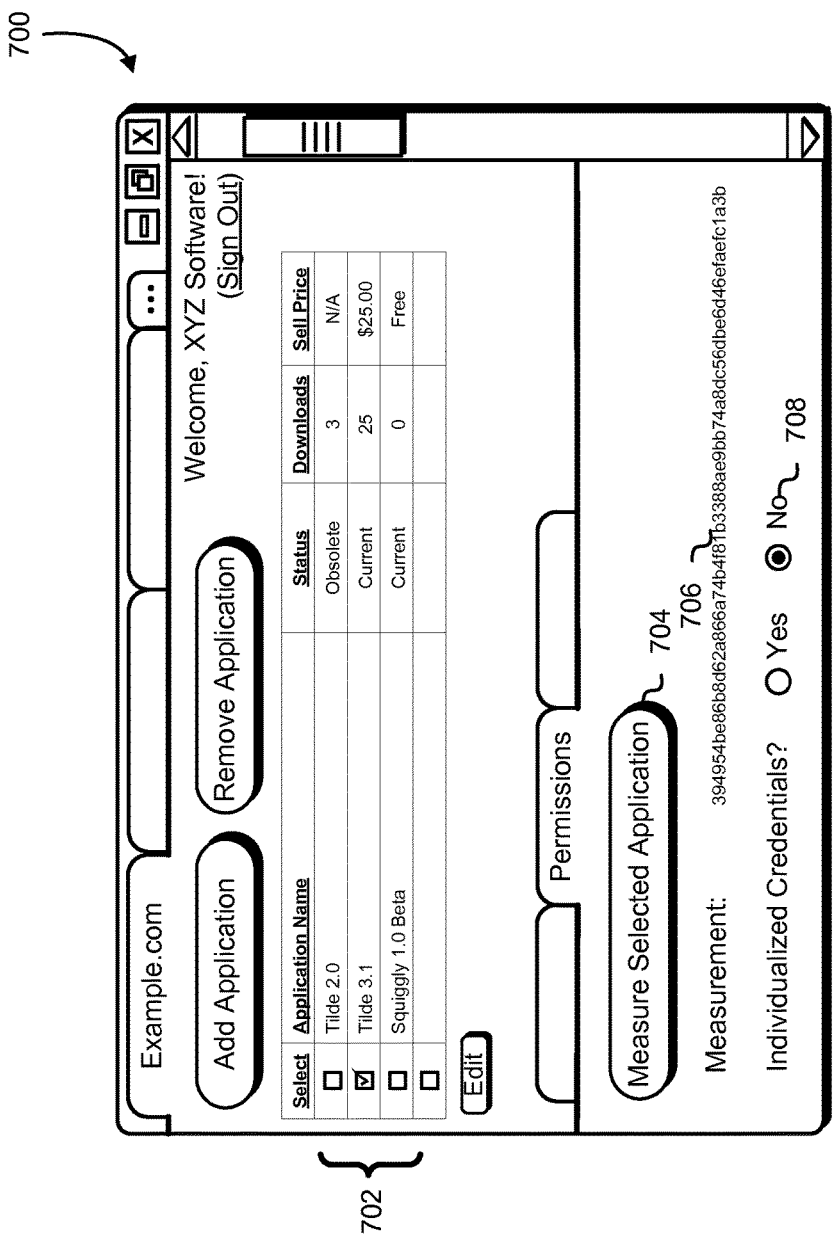
FIG. 7 illustrates an example interface through which a software developer may register applications with an online marketplace in accordance with an embodiment.

In the embodiment illustrated by FIG. 6, the developer 602 may provide the application to the online marketplace 600 through a marketplace interface such as an online marketplace interface 700 depicted in FIG. 7. Note that the online marketplace interface depicted in FIG. 7 is for illustration purposes only, and that other marketplace interfaces as would be contemplated by a person having ordinary skill in the art should also be considered as within the scope of the present disclosure. The online marketplace interface 700 shows a list of applications 702 ("Tilde 2.0," "Tilde 3.1," and "Squiggly 1.0 Beta") that have been uploaded by a developer, "XYZ Software," to the developer's account. The online marketplace interface 700 may provide statistics, such as the number of times the applications 702 have been downloaded by end users since they were made available on the online marketplace. The online marketplace interface 700 may also provide tools (e.g., "Add Application," "Edit," "Remove Application," etc.) for uploading applications, editing information and changing attributes about the applications, such as changing a status ("Obsolete" vs. "Current") or setting a sell price for the applications.

The online marketplace interface also includes tools for managing measurements of uploaded applications, such as depicted by the measure application 704 button. For example, the applications 702 may have been uploaded to the computing resource service provider and clicking on the measure application button 704 may cause the computing resource service provider to launch the application file or files in a container, such as an enclave, and cause the container to output a measurement of the application, such as the measurement 706. In some cases, however, the measurement 706 may be automatically made when the application is uploaded to the computing resource service provider, in which case the measure application button 704 or functional equivalent may not be present.

In other embodiments, an application credential may be customized (i.e., individualized) for each particular copy of the application, such as may be downloaded from an online marketplace. For example, an application developer may upload the application to the online marketplace of a computing resource service provider, and for each download of the application by a purchaser, the computing resource service provider may embed a unique application credential into the binary code of the application or installation file. In this manner, each particular copy may have a credential unique to that particular copy, and the computing resource service provider or application developer may be able to revoke a credential for a particular copy (for example, if the particular purchaser violates the purchase agreement) or rotate or renegotiate the credential for the particular copy (for example, if the particular purchaser reports that an unauthorized party has made a copy of the particular copy). In alternate embodiments, the application credential may be included in a separate file in an installation package of the application. In some of these embodiments, the credential may be associated with multiple copies of the application; for example, if a user obtains a license for a specified number of copies of the application, the same credential may be used for each copy of the specified number of copies.

Thus, the individualized credentials radio buttons 708 may provide functionality to allow each downloaded copy of the application, such as the selected application "Tilde 3.1," to have individualized credentials. For example, the online marketplace provider may embed a unique value, such as a product key, into the executable application code such that when the installed client application is launched and measured, it produces a measurement distinguishable from any other installed client application measurement. In such a situation, the computing resource service provider may measure each application at or before download and register the individualized credential with the downloaded application. In this way, activity, such as resource usage, of each installed application can be tracked, and credential rotated or disabled as needed, without affecting other installed applications. For example, if an application is installed on an electronic device and the electronic device is stolen, the owner of the electronic device may report the theft to the computing resource service provider providing resources for the application and the computing resource service provider may disable the application's access to resources.

Figure 8:
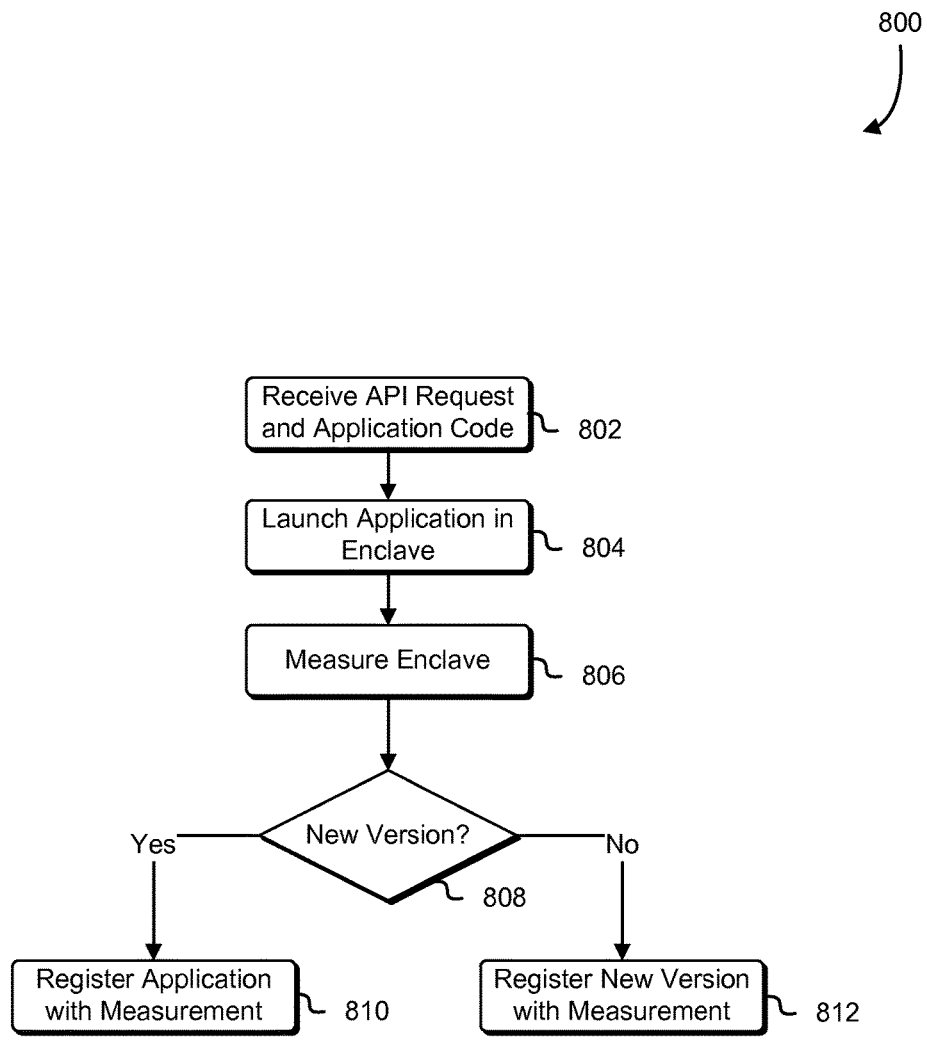
FIG. 8 is a flow chart that illustrates an example of registering an application on an online marketplace in accordance with an embodiment.

FIG. 8 is a flow chart illustrating an example of a process 800 for uploading an application to a provider for measurement and registration in accordance with various embodiments. The process 800 may be performed by any suitable system such as a server in a distributed system of a data center, or any electronic client device such as the electronic client device 1102 described in conjunction with FIG. 11. The process 800 includes a series of operations wherein a developer uploads an application to a provider for measurement and registration. In 802, a provider, such as a computing resource service provider or an online marketplace provider, may receive a request from a developer through an application programming interface. The request may accompany executable code for the application or an installation package for the application and include a variety of option selections, such as what type of operating system and hardware the application is designed to run under and any installation options.

In 804, the provider may launch the application to be measured in a secure execution environment, such as an enclave, running under the conditions specified in the request received in 802. For example, if a developer specifies that the application is to run under a specific operating system and a particular brand and model of central processing unit, the provider may cause a virtual machine instance to be created to simulate the specified operating system and central processing unit, and install the application in the virtual machine instance. The application may then be launched into an enclave, or other secure execution environment, under the specified conditions, and in 806, the execution state of the application may be measured, such as by making a call to the enclave to take a measurement of the application.

In 808, the provider refers to the request of 802 to determine whether the application measurement is a measurement for a new application or whether the measurement is a measurement of a different or new version of a previously-registered application. If the application is new, the system performing the process 800 proceeds to 810 whereupon the application may be registered in a data store of a policy enforcement service as an application identity and credential associated with the particular application. In some embodiments where the application is configured with individualized credentials, such as described in reference to 708 in FIG. 7, the operations of process 800 may be repeated as needed for each copy of the application downloaded from the marketplace in order to register the individualized measurements as credentials for the particular copies. That is, the provider may generate executable code, such as bootstrap code, comprising individualized credentials and insert the executable code into the copy of the application for download. Upon execution of the downloaded application by the end user, the bootstrap code may execute, launch the client application into a container, cause a measurement of the application to be taken, and communicate with the provider to register the installed application with the measurement and/or the individualized credentials.

Otherwise, if the application is a different version of a previously-registered application, such as an application configured to run under a different operating system or hardware, the application may be registered as such in 812. In some cases, this may mean that the different versions share the same application identity but differ in measurement credentials. In some cases, the different version may replace a previous version, if specified in the request of 802, and in those cases, the registrations of the previous version may be inactivated when the different version is registered. Note that the operations performed in 802-12 may be performed in various orders and combinations, including in parallel.

Figure 9:
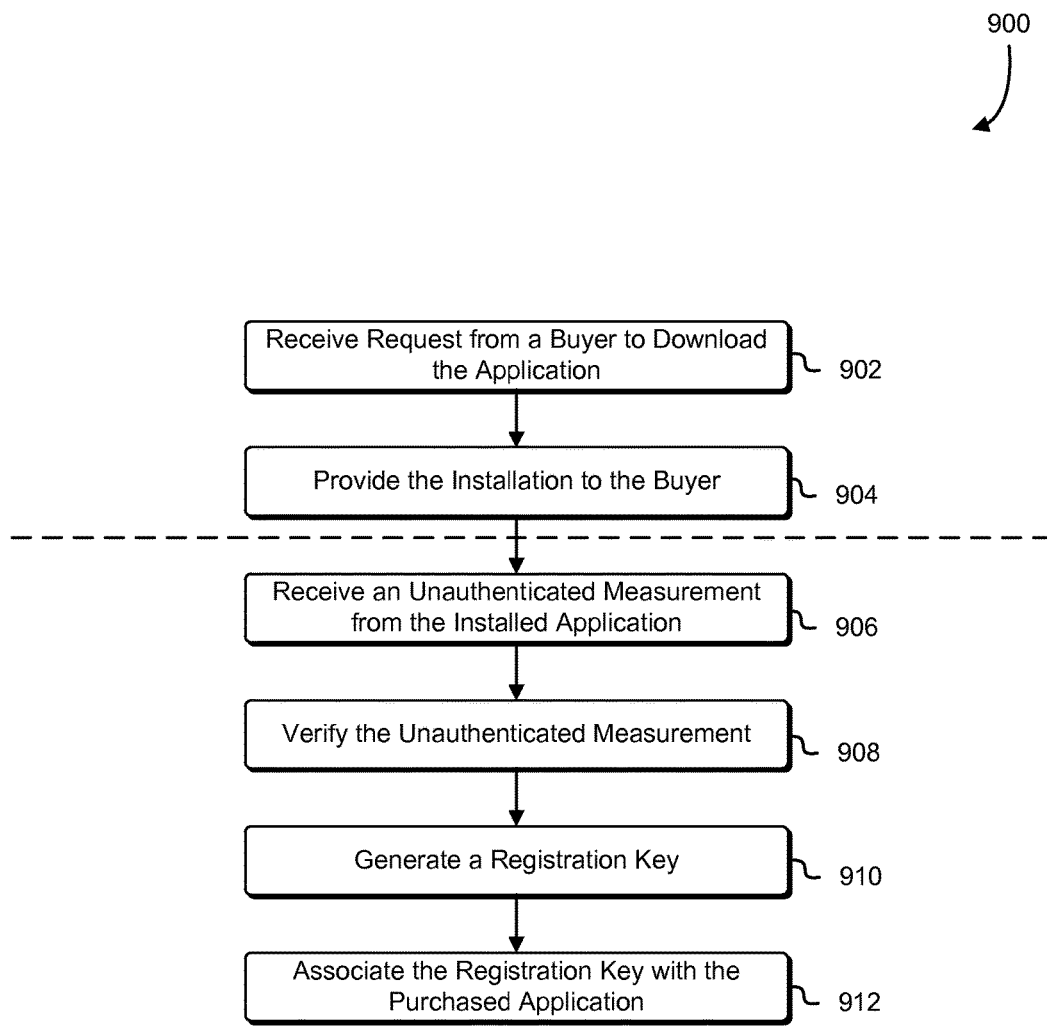
FIG. 9 is a block diagram that illustrates a purchase of an application from an online marketplace in accordance with an embodiment.

FIG. 9 is a block diagram illustrating an example of a process 900 a provider may follow upon receiving a request to download an application made available in accordance with various embodiments. The process 900 may be performed by any suitable system such as a server in a distributed system of a data center, or any electronic client device such as the electronic client device 1102 described in conjunction with FIG. 11. The process 900 includes a series of operations wherein an end user downloads an application, installs the application, and runs the application. In 902, a provider, such as a computing resource service provider or an online marketplace provider, receives a request to download an application from an online marketplace. The application to be downloaded may have been uploaded by a developer, measured and registered in a manner similar to that described in reference to FIG. 8.

In 904, the provider provides the application files to the end user. In some cases, the application may be a standalone executable file, while in other cases the end user may download an installation package that, when executed, will install the application on the client electronic device. As described in reference to 708 of FIG. 7 and elsewhere, the end user application may have individualized credentials. In some cases, the individualized credentials may include a measurement and a product key determined by the provider before or at the time that the application is downloaded by the end user. Note that in some embodiments, the application may be obtained by the end user through channels other than the provider hosting the resources to be accessed by the application. For example, the end user may have purchased the application on non-transient computer-readable media from a local retailer, and in such a case, the operations above the dashed line in the process 900 of FIG. 9 may be omitted.

In 906, after installing or during the installation, the provider may receive a request to register the application. The request may include an application identifier and a measurement of the application that the provider may use to validate the installed application against recorded measurements, such as the measurements registered in the process 800 of FIG. 8. The measurement may have been generated by the application being launched, in some cases by bootstrap code, into an enclave, or other secure execution environment, supported by the hardware or software of the client computing system. In some cases, the measurement may be accompanied by a digital signature of the container, and in some configurations, only certain roots of trusts may be trusted, such as those that may be specified by the application developer through an interface similar to 202 described in conjunction with FIG. 2.

In 908, the provider may validate the measurement received from the installed application against measurements known by the provider to be associated with the application identity to provide assurances that the installed application has not been tampered with by unauthorized parties. If a digital signature of a measuring root of trust has been received, the digital signature may also be verified at this stage of the process 900.

In 910, a product key, voucher, personal identification number, or other protocol for uniquely distinguishing the installed application from other installed applications with the same application identity may be generated or performed. Note that, in many cases, a uniquely-distinguishing characteristic (registration key) may be pre-generated, for example as a product key printed on paper or non-transitory computer readable media, and provided to the provider at this stage, such as by the end user entering the product key through an installation interface. In other embodiments, the registration key may have been pre-generated and embedded in the executable code of the installed application, such as may have been generated before or at the time an end user downloaded or purchased the application. In some cases, the individualized credentials may be configured by using a voucher, a personal identification number, a challenge-response protocol, or product key as described in this disclosure.

In 912, the provider may associate the registration key with the installed application. In this manner, upon subsequent attempts by the installed application to access resources of the provider, the registration key may serve to distinguish the installed application from other valid installed applications being run by other end users. Doing so may allow the provider to track resource usage and log accesses by the installed application, and may additionally allow the provider to disable or rotate the credential of the installed application without affecting applications of other end users. As mentioned, in some cases, the registration key may be in container memory when the application is launched within the container for obtaining a measurement, and, in such cases, the registration of the measurement inherently includes the registration key. In other cases, the registration key may be provided separately, in series or in parallel, with the measurement and application identifier, in future attempts by the installed application to access provider resources. Note that the operations performed in 906-12 may be performed in various orders and combinations, including in parallel.

In some embodiments, a user, the application, or the computing resource service provider may initiate renegotiation of a new credential for the application on demand, such as if the user, application, or computing resource service provider suspects that the credential may have been intercepted by an unauthorized entity. For similar reasons, the application credential may be expired or disabled for the particular installed copy of the application. For example, the application may be an application that a user may use for free for a specified time period, and thereafter the user may need to obtain a subscription credential; in such an example, the computing resource service provider may be configured to automatically disable (i.e., expire) the credential after the specified time period. As another example, the application may be installed in a virtual machine instance of a virtual computer system service of the computing resource service provider. In this example, the computing resource service provider environment may be configured to disable the credential of the particular copy of the application if the virtual machine instance is ever deprovisioned. In this manner, if unauthorized copies of the installed application had been made, the unauthorized copies may be rendered non-functional.

Furthermore, an application, resource, service, or computing resource service provider may be configured to rotate or re-negotiate credentials or cryptographic keys in use by the installed applications periodically, stochastically, probabilistically, or on demand. For example, an application may be configured to negotiate new cryptographic keys for use in secure communication between the installed application and services of the computing resource service provider each time it is executed, so that the cryptographic keys may only be used once. Likewise, a cryptographic key may expire and require replacement every stochastically-determined number of days or number of uses. Because the measurement of the installed application and the exchange of identifier and credential between the installed application and the computing resource service provider allows the computing resource service provider to distinguish one installed application from another, the rotation of cryptographic key may be done automatically without impact or knowledge of the users of the installed application or other installed applications.

FIG. 10 shows an example of a customer connected to a computing resource service provider in accordance with an embodiment. The computing resource service provider 1002 may provide a variety of services to the customer 1004 and the customer 1004 may communicate with the computing resource service provider 1002 via an interface 1026, which may be a web services interface or any other type of customer interface. While FIG. 10 shows one interface 1026 for the services of the computing resource service provider 1002, each service may have its own interface and, generally, subsets of the services may have corresponding interfaces in addition to or as an alternative to the interface 1026. The customer 1004 may be an organization that may utilize the services provided by the computing resource service provider 1002 to maintain and deliver information to its employees, which may be located in various geographical locations. Additionally, the customer 1004 may be an individual that utilizes the services of the computing resource service provider 1002 to deliver content to a working group located remotely. As shown in FIG. 10, the customer 1004 may communicate with the computing resource service provider 1002 through a network 1006, whereby the network 1006 may be a communication network, such as the Internet, an intranet or an Internet service provider (ISP) network. Some communications from the customer 1004 to the computing resource service provider 1002 may cause the computing resource service provider 1002 to operate in accordance with embodiments described or a variation thereof.

The computing resource service provider 1002 may provide various computing resource services to its customers. The services provided by the computing resource service provider 1002, in this example, include a virtual computer system service 1008, a block-level data storage service 1010, a cryptography service 1012, an on-demand data storage service 1014, a notification service 1016, an authentication system 1018, a policy management service 1020, a task service 1022 and other services 1024. It is noted that not all embodiments described include the services 1008-24 described with reference to FIG. 10 and additional services may be provided in addition to or as an alternative to services explicitly described. Each of the services 1008-24 may include web service interfaces that enable the customer 1004 to submit appropriately configured API calls to the various services through web service requests. In addition, each of the services may include service interfaces that enable the services to access each other (e.g., to enable a virtual computer system of the virtual computer system service 1008 to store data in or retrieve data from the on-demand data storage service 1014 and/or to access block-level data storage devices provided by the block level data storage service 1010).

The virtual computer system service 1008 may be a collection of computing resources configured to instantiate virtual machine instances on behalf of the customer 1004. The customer 1004 may interact with the virtual computer system service 1008 (via appropriately configured and authenticated API calls) to provision and operate virtual computer systems that are instantiated on physical computing devices hosted and operated by the computing resource service provider 1002. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 1008 is shown in FIG. 10, any other computer system or computer system service may be utilized in the computing resource service provider 1002, such as a computer system or computer system service that does not employ virtualization or instantiation and instead provisions computing resources on dedicated or shared computers/servers and/or other physical devices.

The block-level data storage service 1010 may comprise computing resources that collectively operate to store data for a customer 1004 using block-level storage devices (and/or virtualizations thereof). The block-level storage devices of the block-level data storage service 1010 may, for instance, be operationally attached to virtual computer systems provided by the virtual computer system service 1008 to serve as logical units (e.g., virtual drives) for the computer systems. A block-level storage device may enable the persistent storage of data used/generated by a corresponding virtual computer system where the virtual computer system service 1008 may only provide ephemeral data storage.

The computing resource service provider 1002 also includes a cryptography service 1012. The cryptography service 1012 may utilize storage services of the computing resource service provider 1002 to store keys of the customers in encrypted form, whereby the keys may be usable to decrypt customer 1012 keys accessible only to particular devices of the cryptography service 1012.

The computing resource service provider 1002 further includes an on-demand data storage service 1014. The on-demand data storage service 1014 may be a collection of computing resources configured to synchronously process requests to store and/or access data. The on-demand data storage service 1014 may operate using computing resources (e.g., databases) that enable the on-demand data storage service 1014 to locate and retrieve data quickly, and to allow data to be provided in responses to requests for the data. For example, the on-demand data storage service 1014 may maintain stored data in a manner such that, when a request for a data object is retrieved, the data object can be provided (or streaming of the data object can be initiated) in a response to the request. As noted, data stored in the on-demand data storage service 1014 may be organized into data objects. The data objects may have arbitrary sizes except, perhaps, for certain constraints on size. Thus, the on-demand data storage service 1014 may store numerous data objects of varying sizes. The on-demand data storage service 1014 may operate as a key value store that associates data objects with identifiers of the data objects that may be used by the customer 1004 to retrieve or perform other operations in connection with the data objects stored by the on-demand data storage service 1014.

In the environment illustrated in FIG. 10, a notification service 1016 is included. The notification service 1016 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1016 may provide notifications to clients using a "push" mechanism without the need to check periodically or "poll" for new information and updates. The notification service 1016 may further be used for various purposes such as monitoring applications executing in the virtual computer system service 1008, workflow systems, time-sensitive information updates, mobile applications, and many others.

As illustrated in FIG. 10, the computing resource service provider 1002, in various embodiments, includes an authentication system 1018 and a policy management service 1020. The authentication system 1018, in an embodiment, is a computer system (i.e., collection of computing resources) configured to perform operations involved in authentication of users of the customer. For instance, one of the services 1008-16 and 1020-24 may provide information from a user to the authentication service 1018 to receive information in return that indicates whether the user requests are authentic.

The policy management service 1020, in an embodiment, is a computer system configured to manage policies on behalf of customers (such as customer 1004) of the computing resource service provider 1002. The policy management service 1020 may include an interface that enables customers to submit requests related to the management of policy. Such requests may be, for instance, requests to add, delete, change or otherwise modify policy for a customer or for other administrative actions, such as providing an inventory of existing policies and the like.

The computing resource service provider 1002, in various embodiments, is also equipped with a task service 1022. The task service 1022 is configured to receive a task package from the customer 1004 and enable executing tasks as dictated by the task package. The task service 1022 may be configured to use any resource of the computing resource service provider 1002, such as instantiated virtual machines or virtual hosts, for executing the task. The task service 1024 may configure the instantiated virtual machines or virtual hosts to operate using a selected operating system and/or a selected execution application in accordance with a requirement of the customer 1004.

The computing resource service provider 1002 additionally maintains other services 1024 based at least in part on the needs of its customers 1004. For instance, the computing resource service provider 1002 may maintain a database service for its customers 1004. A database service may be a collection of computing resources that collectively operate to run databases for customers 1004. The customer 1004 may operate and manage a database from the database service by utilizing appropriately configured API calls. This, in turn, may allow a customer 1004 to maintain and potentially scale the operations in the database. Other services include object-level archival data storage services and services that manage and/or monitor other services.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 11:
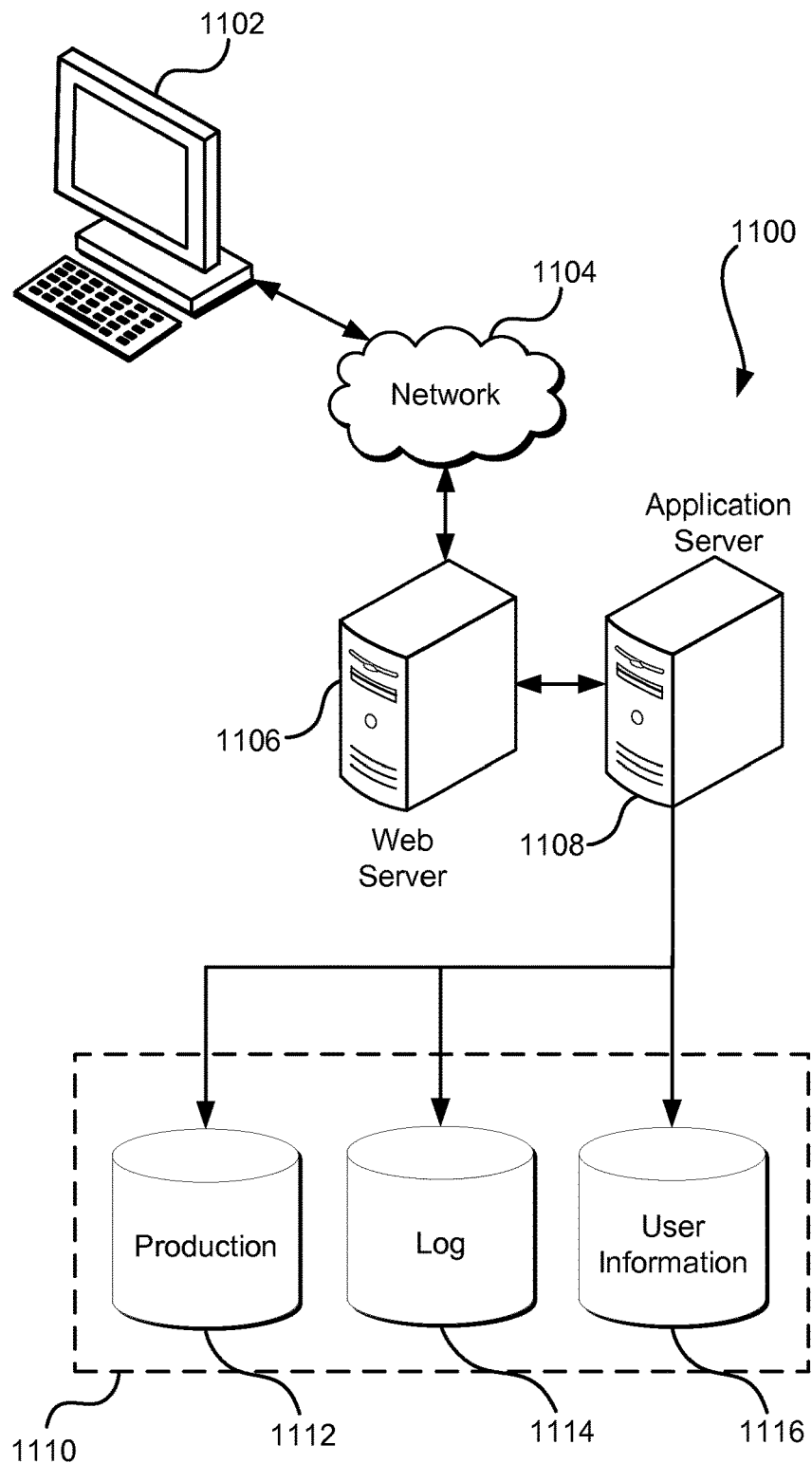
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes an application server 1108 and a data store 1110. It should be understood that there could be several application servers, layers or other elements, processes or components, which may be chained or otherwise configured, which can interact to perform tasks such as obtaining data from an appropriate data store. Servers may be implemented in various ways, such as hardware devices or virtual computer systems. In some contexts, servers may refer to a programming module being executed on a computer system. Unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code can be executed on any appropriate device or host machine. Further, operations described as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there could be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM®, as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus; the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are hereby incorporated by reference to the same extent as if each reference were individually and specifically indicated to be incorporated by reference and were set forth in its entirety.

What is claimed is:

1. A computer-implemented method, comprising:
   receiving, at an application programming interface of a computing resource service provider, a request from a customer of the computing resource service provider to associate a measurement of executable instructions of an application operating within an enclave with an application identity of the application, wherein the application identity specifies a version for the application;
   registering the measurement in association with the application identity in a data store of a policy enforcement service;
   receiving, at a service of the computing resource service provider, a request from a version of an installed application to access a resource in an environment of the computing resource service provider, the request specifying the application identity and a credential;
   authenticating the version of the installed application by determining that the received application identity matches a registered application identity and verifying that the credential is a measurement of executable instructions of the installed application that matches the measurement of executable instructions of the application; and
   allowing the version of the installed application to access the resource.

2. The computer-implemented method of claim 1, wherein the method further comprises:
   receiving, at the application programming interface, application code for the application;
   executing the application code in an enclave of the computing resource service provider; and
   generating the measurement at least in part by measuring the application code in the enclave.

3. The computer-implemented method of claim 1, wherein the method further includes registering a code corresponding to one or more instances of the installed application in association with the application identity.

4. The computer-implemented method of claim 1, wherein:
   the application identity is associated with one or more policies allowing the application to access one or more resources in the environment of the computing resource service provider; and
   the authenticating further includes confirming that the one or more policies allow the application to access the resource.

5. The computer-implemented method of claim 1, wherein verifying that the credential is a measurement of executable instructions of the installed application that matches the measurement of executable instructions of the application includes verifying that an attestation associated with the measurement of executable instructions of the installed application corresponds to an accepted root of trust.

6. A system, comprising:
   memory to store instructions, if executed by one or more processors, cause the system to at least:
      receive a request to associate an application instance definition with an application identity specifying a version of an application, wherein the application instance definition is a measurement produced by measuring at least a portion of an instance of the application executing within an enclave;
      store the application instance definition in association with the application identity;
      receive a request from a version of an installed client application to access a resource, the request specifying the application identity and a credential;
      determine that the credential is another application instance definition that matches the application instance definition and that the received application identity matches the application identity associated with the application instance definition; and
      allow the version of the client application to access the resource.

7. The system of claim 6, wherein the system further comprises:
   an application marketplace; and
   the request to associate an application instance definition with the application identity is received from the marketplace in response to a request to provide the application to an end user.

8. The system of claim 6, wherein a bootloader causes the at least a portion of the instance of the application be launched into the enclave and causes the enclave to measure the at least a portion of the instance of the application.

9. The system of claim 6, wherein the application identity is associated with a plurality of application instance definitions that correspond to different versions of the application.

10. The system of claim 9, wherein the different versions of the application are manageable through an interface of a computing resource service provider.

11. The system of claim 6, wherein the application identity is associated with a plurality of application instances of the application.

12. The system of claim 11, wherein one or more cryptographic keys used by an individual application instance of the plurality of application instances are rotatable independently from cryptographic keys used by other application instances of the plurality of application instances.

13. A non-transitory computer-readable storage medium having stored thereon executable instructions that, as a result of execution by one or more processors of a computer system, cause the computer system to at least:
  receive a request from a version of an installed client application to access a resource of a provider, wherein the request includes a measurement of an application instance measured executing within an enclave;
  obtain, from a data store that associates measurements of application instances with application identities, an application identity and a credential for the version of the client application associated with the measurement;
  determine, based at least in part on the application identity and the credential, a respective set of permissions associated with the application identity;
  determine that the respective set of permissions are sufficient to allow the version of the application to access the resource; and
  fulfill the request by allowing the version of the client application to access the resource.

14. The non-transitory computer-readable storage medium of claim 13, wherein the executable instructions further cause the computer system to deliver the application to an end user through an online marketplace that offers applications for delivery.

15. The non-transitory computer-readable storage medium of claim 13, wherein the executable instructions further cause the computer system to:
  generate code to be inserted into the application for delivery;
  cause the code to be inserted into the application for delivery; and
  cause at least a portion of the code to be registered with a computing resource service provider in association with the application for delivery.

16. The non-transitory computer-readable storage medium of claim 15, wherein the code to be inserted into the application for delivery includes bootstrapping code that, when executed by the one or more processors, causes executable instructions of the application in memory to be measured before a first instruction of the executable instructions is executed.

17. The non-transitory computer-readable storage medium of claim 13, wherein the measurement is a constituent of a plurality of credentials stored in the data store, each of which is associated with at least one installation of the application.

18. The non-transitory computer-readable storage medium of claim 17, wherein the executable instructions that cause the computer system to at least receive the request from the client application cause the computer system to at least:
  receive the measurement through a bootstrapping process of the at least one installation of the application, the measurement being a measurement of an execution state of the application; and
  associate the measurement with the at least one installation of the application.

19. The non-transitory computer-readable storage medium of claim 17, wherein the executable instructions that cause the computer system to receive the request from the client application include instructions that cause the computer system to at least:
  request, from an end user, one or more install codes of the at least one installation of the application;
  receive the one or more install codes from the end user; and
  register the one or more install codes and the measurement as a credential in association with the at least one installation of the application dependent at least in part on successful verification of the provided one or more install codes.

* * * * *